United States Patent

Kodama et al.

[11] Patent Number: 5,161,415
[45] Date of Patent: Nov. 10, 1992

[54] PRESSURE SENSOR

[75] Inventors: Seiki Kodama; Toshio Iwata; Yasuo Tada, all of Hyogo, Japan

[73] Assignee: Mitsubishi Denki K.K., Tokyo, Japan

[21] Appl. No.: 683,632

[22] Filed: Apr. 11, 1991

[51] Int. Cl.$^5$ .......................... G01L 7/08; G01L 9/00; G01L 19/04
[52] U.S. Cl. .......................... 73/708; 73/706; 73/720; 73/754; 73/756
[58] Field of Search .................. 73/708, 706, 754, 715, 73/756, 115, 723, 724, 725, 726, 727, 728, 729, 730, DIG. 4, 753; 338/4, 42, 720, 721

[56] References Cited

U.S. PATENT DOCUMENTS

| 3,050,085 | 8/1962 | Reese | 73/708 |
| 3,140,613 | 7/1964 | Hasegawa | 73/708 |
| 3,596,520 | 8/1971 | Walpole | 73/708 |

OTHER PUBLICATIONS

U.S. Ser. No. 07/798,588, filed Nov. 26, 1991; assigned to GAU: 2611.
U.S. Ser. No. 07/710,987; filed Jun. 6, 1991; assigned to GAU: 2613.

Primary Examiner—Donald O. Woodiel
Attorney, Agent, or Firm—Sughrue, Mion, Zinn, Macpeak & Seas

[57] ABSTRACT

A pressure sensor comprising a case, a diaphragm provided within the case, a pressure detecting part provided within the case for detecting pressure applied to the diaphragm, and a pressure transmission chamber formed between the diaphragm and the pressure detecting part for sealingly accommodating therein liquid through which the pressure is transmitted from the diaphragm to the pressure detecting part. The pressure transmission chamber is arranged to cope with the volume changes of the liquid due to the temperature changes thereof.

16 Claims, 3 Drawing Sheets

PRESSURE SENSOR

FIELD OF THE INVENTION

The present invention relates to a pressure sensor in which pressure transmission liquid is sealingly accommodated in a pressure transmission chamber provided between a pressure detecting part and a diaphragm.

BACKGROUND OF THE INVENTION

FIG. 1 is a longitudinal sectional view showing an example of a pressure sensor for detecting pressure in a combustion chamber of a conventional engine. The pressure lo sensor comprises a case 1 attached to an engine body (not shown), a pressure detecting part 2 comprised of a semiconductor strain gage and provided in the case 1, a signal line 3 connected at the tip end thereof to the pressure detecting part 2, a plug 4 for sealing the case 1, a diaphragm 5 provided on a lower end of the case 1, and pressure transmission liquid 6 having a high boiling point, sealingly accommodated in a pressure transmission chamber 7 defined between the diaphragm 5 and the pressure detecting part 2 within the case 1.

In the pressure sensor thus constructed, the pressure increase in the combustion chamber of the engine causes the diaphragm 5 to be deformed, so that the pressure of the pressure transmission liquid 6 is increased in connection with such deformation of the diaphragm 5, and then, such pressure increase of the pressure transmission liquid 6 is detected by the pressure detecting part 2. Based on the detection, a combustion state of the combustion chamber is judged so as to, for example, control an ignition timing for an ignition plug.

The conventional pressure sensor, however, has problems in which depending on changes in temperature of the circumstance e.g., the area, around the pressure sensor, i.e. in the ambient temperature, the pressure transmission liquid 6 is changed not only in volume but also in pressure, so that such changes of the pressure transmission liquid 6 adversely affect the readout of the pressure detecting part 2 as if the pressure changes in the combustion chamber occur.

SUMMARY OF THE INVENTION

Accordingly, it is an object of the present invention to solve the above-mentioned problem in the conventional pressure sensor.

More specifically, an object of the present invention is to provide a pressure sensor accurately detecting the pressure changes in the combustion chamber regardless of the temperature changes of the area around the pressure sensor.

In order to attain the above-noted and other objects, the present invention provides a pressure sensor comprising a case, a diaphragm provided within the case, pressure detecting means provided within the case for detecting pressure applied to the diaphragm, the pressure detecting means defining, in cooperation with the diaphragm, a pressure transmission chamber, for sealingly accommodating therein liquid through which the pressure is transmitted from the diaphragm to the pressure detecting means, and means for absorbing volume changes of the liquid, which are caused due to temperature changes of the liquid.

The absorbing means may be arranged to vary the capacity of the pressure transmission chamber in accordance with the volume changes of the liquid, or otherwise, in response to the temperature changes of the liquid. Also, the absorbing means may be arranged such that an amount of the volume changes is extremely reduced.

DETAILED DESCRIPTION OF THE PREFERRED EMBODIMENTS

Figure 1:
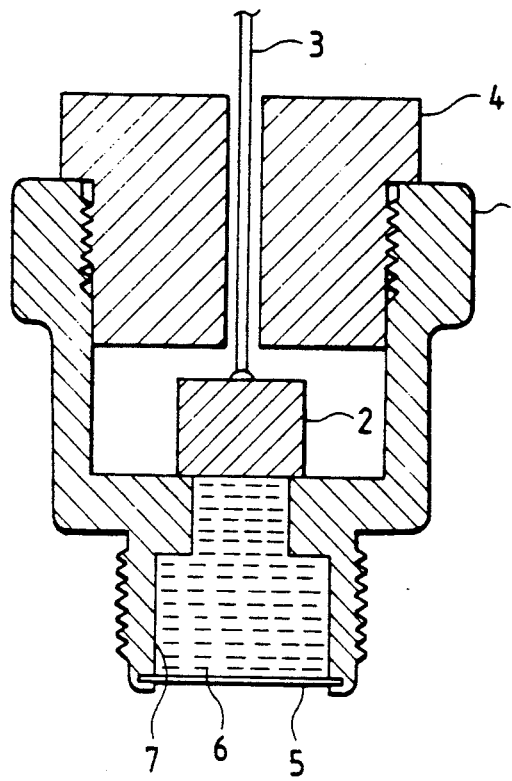
FIG. 1 is a longitudinal sectional view showing an example of a pressure sensor.

Preferred embodiments of the present invention will now be described with reference to the accompanying drawings. In the accompanying drawings, the mutually same or corresponding portions of a pressure sensor according to each of the embodiments of the present invention and the pressure sensor shown in FIG. 1 are denoted by the same reference numerals for the purpose of omitting the repetition of the explanation thereof.

Figure 2:
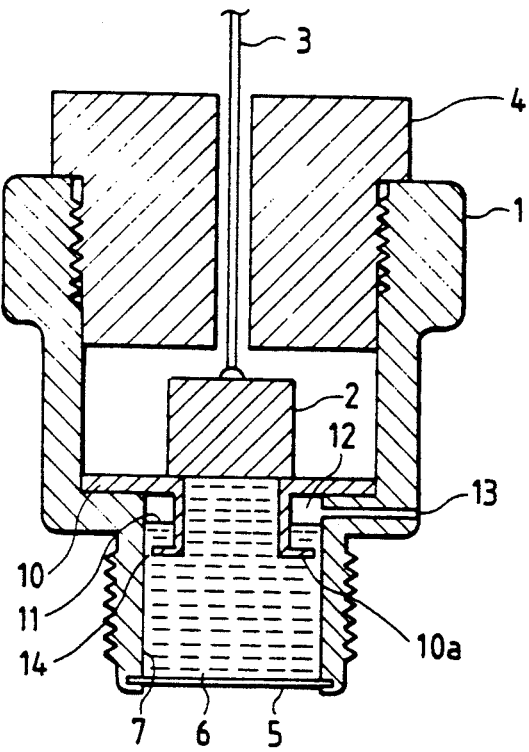
FIG. 2 is a longitudinal sectional view showing a pressure sensor according to a first embodiment of the present invention.

FIG. 2 shows a pressure sensor according to a first embodiment of the present invention.

In a first embodiment, in order to cope with the volume changes of the pressure transmission liquid due to the ambient temperature changes of the area surrounding the pressure sensor, there is provided means for varying the capacity of the pressure transmission chamber 7 in accordance with the volume changes of the pressure transmission liquid 6.

The capacity varying means comprises a sub-case 10 provided at a relatively lower portion within the case 1 for defining a sub-part of the pressure transmission chamber 7, a sub-diaphragm 11 provided within the sub-case 10, a pressure adjusting chamber 12 formed in a space above the sub-diaphragm 11, a through hole 13 formed in the case 1 so as to communicate the pressure adjusting chamber 12 with the ambient atmosphere, and a gap portion 14 formed between a lower flange 10a of the sub-case 10 and the case 1.

In the pressure sensor thus constructed, in the case where the pressure transmission liquid 6 is gradually changed in volume due to the ambient temperature changes around the pressure sensor, the volume changes of the transmission liquid 6 are transmitted to the sub-part through the gap portion 14 and absorbed by the sub-diaphragm 11. Thus the pressure within the pressure transmission chamber 7 is kept the same as that of the area around the pressure sensor because the pressure adjusting chamber 12 is communicated with the ambient atmosphere through the through hole 13. Accordingly, the pressure detecting part 2 is prevented from detecting the volume changes of the pressure liquid 6 as abnormal changes occur within the combustion chamber. On the other hand, in the case where the pressure within the combustion chamber is rapidly changed due to ignition, the rapid pressure changes are received by the diaphragm 5 and are transmitted to the pressure liquid 6. However, the rapid pressure changes are prevented from being transmitted to the sub-diaphragm 11 by the gap portion 14 provided in front of the sub-diaphragm 11. Therefore, the pressure detecting part 2 can accurately and directly detect the abnormal pressure changes within the combustion chamber. Accordingly, due to the provision of the capacity varying means, the pressure within the combustion chamber is accurately detected without adverse affect due to the volume changes of the pressure transmission liquid in accordance with the temperature changes of the ambient atmosphere.

Figure 3:
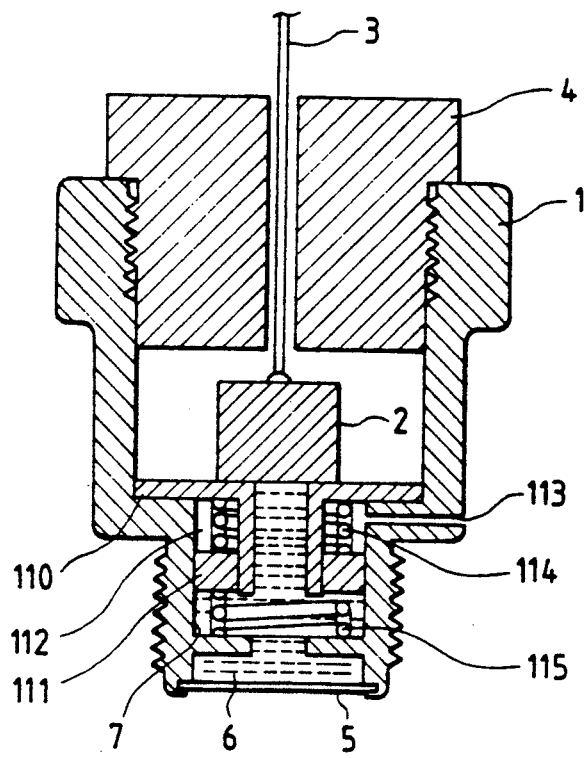
FIG. 3 is a longitudinal sectional view showing a pressure sensor according to a second embodiment of the present invention.

FIG. 3 shows a pressure sensor according to a second embodiment of the present invention.

In a second embodiment, there is provided means for varying capacity of the pressure transmission chamber 7 in response to the temperature changes of the pressure transmission liquid 6.

The capacity varying means comprises a sub-case 110 provided in a relatively lower portion of the case 1 and having the pressure detecting part 2 attached at its center portion, a ring 111 slidably provided on a lower portion of the sub-case 110 and designated as a boundary to thereby define a pressure adjusting chamber 112, a through hole 113, formed in the case 1, through which the pressure adjusting chamber is communicated with the ambient atmosphere, a sub-spring 114 provided in the pressure adjusting chamber 112 for depressing the ring 111, and a main spring 115 provided in the pressure transmission chamber 7 for urging the ring 111 upwardly. Since the spring 115 is designated as a heat sensitive part and made of shape memory alloys, the spring 115 can be deformed in response to the temperature changes of the pressure transmission liquid 6 so as to vary the position of the ring 111.

In the pressure sensor thus constructed, in the case where the pressure transmission liquid 6 is changed in temperature and volume in accordance with the temperature changes of the ambient atmosphere around the pressure sensor, the spring 115 is thermally deformed in response to the temperature changes of the pressure transmission liquid 6. For example, in the case where the pressure transmission liquid 6 expands in volume due to its temperature rising, the ring 111 is pressed and moved upward to such an extent that it corresponds to an amount of the expanded volume of the pressure transmission liquid 6, due to the effect of the thermally deformed and extended spring 115, so that the capacity of the pressure transmission chamber 7 is increased. Accordingly, the inner pressure of the pressure transmission chamber 7 is maintained constant before and after the temperature of the pressure transmission liquid 6 has risen. In other words, even if the pressure transmission liquid 6 is changed in volume in accordance with the ambient temperature changes, the pressure detecting part 2 is prevented from detecting the pressure changes due to such volume changes.

Accordingly, the pressure detecting part 2 accurately detects abnormalities within the combustion chamber of the engine regardless of the temperature changes.

In the pressure sensor shown in FIG. 3, if the spring 115 of the shape memory alloys is made to have reversible characteristics, it is possible to dispense with the spring 114 in the pressure sensor.

Also, it is possible to dispense with the through hole 113 if the pressure adjusting chamber is used as a vacuum chamber.

Figure 4:
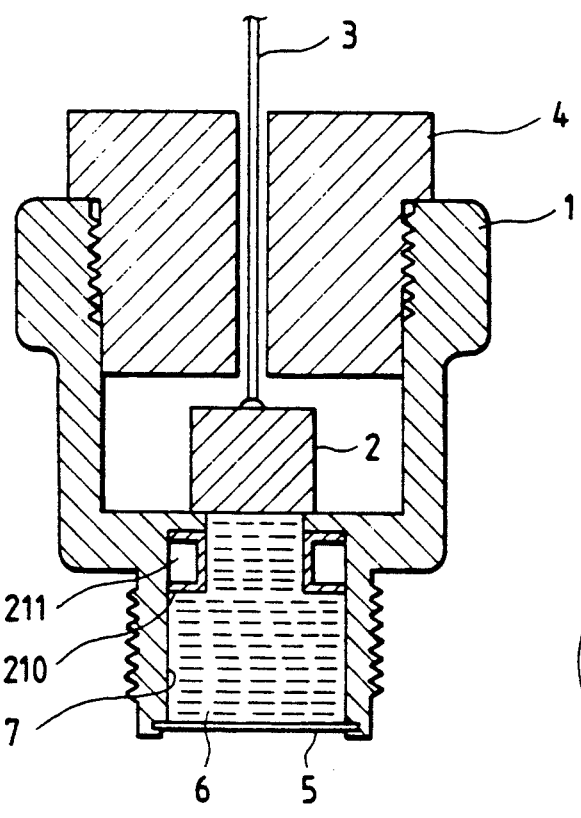
FIG. 4 is a longitudinal sectional view showing a pressure sensor according to a third embodiment of the present invention.
Figure 5:
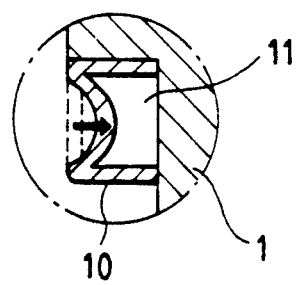
FIG. 5 is an enlarged cross-sectional view showing a major part of the pressure sensor shown in FIG. 4.

FIGS. 4 and 5 show a pressure sensor according to a third embodiment of the present invention.

In the third embodiment, there is provided means for varying capacity of the pressure transmission chamber 7 in response to the temperature changes of the pressure transmission liquid 6.

The capacity varying means comprises a heat sensitive part 210 forming a pressure adjusting chamber 211 separated from the pressure transmission chamber 7. The heat sensitive part 210 is made of shape memory alloys so as to be thermally deformed in accordance with the volume changes of the pressure transmission liquid 6 due to the temperature changes thereof.

The sensitive part 210 includes a cylindrical portion and flanges extending from opposite ends of the cylindrical portion, so that the part 210 has a ring-like shape. The heat sensitive part 210 is provided on an inner cylindrical surface of the case 1 within the pressure transmission chamber 7, thereby defining the pressure adjusting chamber 211 and separating the chamber 211 from the pressure transmission liquid 6.

In the pressure sensor thus constructed, in the case where the volume of the pressure transmission liquid 6 is changed due to the temperature changes thereof, the heat sensitive part 210 is thermally deformed in response to the temperature changes of the pressure transmission liquid 6. For example, if the pressure transmission liquid 6 expands in volume due to the rising temperature of the pressure transmission liquid 6, the heat sensitive part 210 is deformed to project toward the pressure adjusting chamber 211 as shown in FIG. 5. As a result, the capacity of the pressure transmission chamber 7 is increased. Therefore, the inner pressure within the pressure transmission chamber 7 is maintained at a constant value before and after the temperature of the pressure transmission liquid 6 has risen. Thus, the pressure detecting part 2 is prevented from detecting the pressure changes caused due to the volume changes of the pressure transmission liquid 6 in accordance with the ambient temperature changes. Accordingly, the pressure detecting part 2 can accurately detect the pressure changes within the combustion chamber irrespective of the ambient temperature changes.

Figure 6:
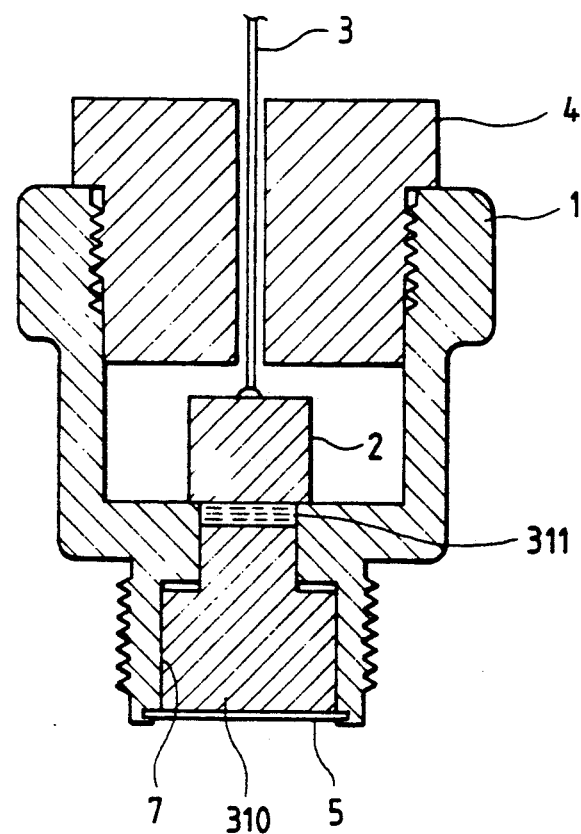
FIG. 6 is a longitudinal sectional view showing a pressure sensor according to a fourth embodiment of the present invention.

FIG. 6 shows a pressure sensor according to a fourth embodiment of the present invention. The pressure sensor comprises a sliding part 310 slidably provided within the pressure transmission chamber 7 and made of a material having a low thermal expansion coefficient, and pressure transmission liquid 311 composed of silicon oil having its boiling points at high temperature and sealingly accommodated between the sliding part 310 and the pressure detecting part 2.

In the pressure sensor thus constructed, the volume of the pressure transmission liquid 311 is greatly reduced in comparison with that of the pressure transmission liquid 6 in the conventional pressure sensor, so that, for example, even if the volume expansion occurs due to the temperature rise of the pressure transmission liquid 311, the expansion of the pressure transmission liquid 311 can be suppressed to a very low level in comparison with the conventional pressure sensor. Further, since the expansion amount of the pressure transmission liquid 311 is suppressed to a very low level and the case 1 having a low thermal expansion coefficient also expands due to the temperature rise, it is possible to absorb such expansion of the pressure transmission liquid 311 by the expansion of the case 1. As a result, the pressure of the pressure transmission liquid 311 is prevented from increasing due to the ambient temperature changes, so that the pressure detecting part can accurately detect desired pressure changes due to the abnormality in the combustion chamber.

Figure 7:
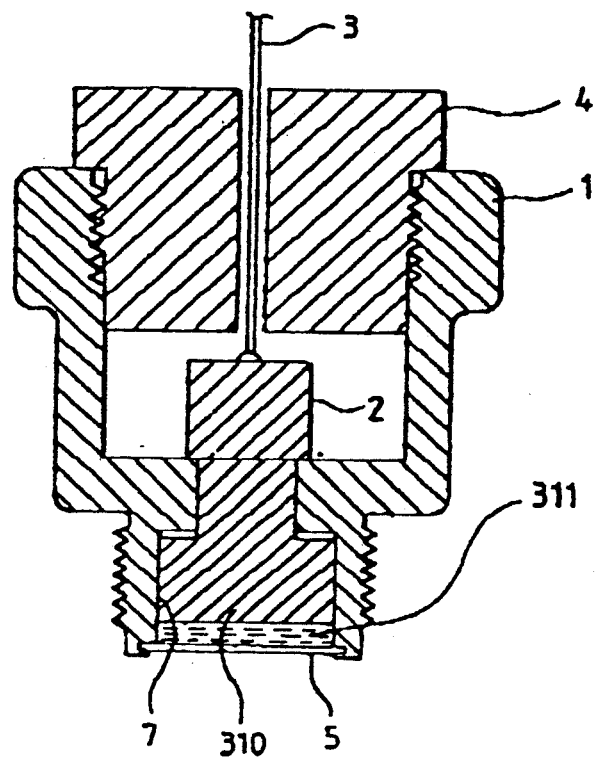
FIG. 7 is a longitudinal sectional view showing a pressure sensor according to a fifth embodiment of the present invention.

In the pressure sensor shown in FIG. 6, the pressure transmission liquid 311 is accommodated between the pressure detecting part 2 and the slider 310. However, the invention should not be restricted thereto or thereby. For example, as shown in FIG. 7, the pressure transmission liquid 311 may be accommodated between the diaphragm 5 and the slider 310 while keeping the slider 310 in contact with the pressure detecting part 2.

In the above-described embodiments, the present invention is explained for a pressure sensor for detecting the pressure within a combustion chamber of an engine. However, the pressure sensor of the present invention can also be applied to any devices other than the engine.

Also, a semiconductor strain gage is applied to a pressure detecting part. However, the present invention should not be limited thereto or thereby. For example, piezoelectric elements can be used as the pressure detecting part.

Further, although silicon oil is used as pressure transmission liquid, any other liquid having a high boiling point can be applied as the pressure transmission liquid.

Furthermore, as a heat sensitive part, a member made of shape memory alloys is applied. However, any other members can be applied thereto if the member can be deformed to absorb the volume changes of the pressure transmission liquid due to the temperature changes thereof.

What is claimed is:

1. A pressure sensor, comprising:
    a case;
    a diaphragm provided within said case;
    pressure detecting means provided within said case for detecting pressure applied to said diaphragm, said case, said pressure detecting means and said diaphragm being coupled together to define therebetween a pressure transmission chamber for sealingly accommodating therein liquid through which said pressure is transmitted from said diaphragm to said pressure detecting means; and
    means for absorbing volume changes of said liquid, which are caused due to temperature changes of said liquid,
    wherein said absorbing means includes means for varying a capacity of said pressure transmission chamber in accordance with said volume changes of said liquid, and
    wherein said varying means includes a sub-chamber provided within said case in communication with an ambient atmosphere, a member for dividing said pressure transmission chamber into a main part and a sub-part, said main part and said sub-part communicating with each other through a gap, and a sub-diaphragm provided between said sub-chamber and said sub-part for separating said sub-chamber from said sub-part.

2. The pressure sensor according to claim 1, wherein said case is formed with a through hole through which said sub-chamber is communicated with the ambient atmosphere.

3. The pressure sensor according to claim 1, wherein said member includes a cylindrical part and first and second flanges formed on opposite ends of said cylindrical part, said first flange being attached to said case and said cylindrical part and said second flange defining said sub-part within said pressure transmission chamber, wherein said second flange is formed to have a slightly smaller diameter than that of an inner cylindrical surface of said case, thereby forming said gap between said second flange and said case.

4. A pressure sensor, comprising:
    a case;
    a diaphragm provided within said case;
    a pressure detecting means provided within said case for detecting pressure applied to said diaphragm, said case, said pressure detecting means and said diaphragm being coupled together to define therebetween a pressure transmission chamber for sealingly accommodating therein liquid through which said pressure is transmitted from said diaphragm to said pressure detecting means; and
    means for absorbing volume changes of said liquid, which are caused due to temperature changes of said liquid,
    said absorbing means including means for varying a capacity of said pressure transmission chamber in response to said temperature changes of said liquid, and
    wherein said varying means includes a movable boundary member for varying said capacity of said pressure transmission chamber, and a heat sensitive part for urging said boundary member to move in response to said temperature changes of said liquid.

5. The pressure sensor according to claim 4, wherein said heat sensitive part is a coil spring made of shape memory alloys.

6. The pressure sensor according to claim 4, wherein said varying means further includes a spring for depressing said boundary member to move in cooperation with said heat sensitive part an amount corresponding to volume changes of said liquid due to said temperature changes.

7. The pressure sensor according to claim 4, wherein said varying means further includes a member defining a pressure adjusting chamber within said pressure transmission chamber and having a cylindrical part on which said boundary member slides and a flange attached to said case and arranged to extend from one end of said cylindrical part.

8. The pressure sensor according to claim 7, wherein said case is formed with a through hole through which said pressure adjusting chamber is communicated with the ambient atmosphere.

9. The pressure sensor according to claim 7, wherein said heat sensitive part comprises a coil spring made of shape memory alloys.

10. The pressure sensor according to claim 9, wherein said varying means further includes a spring for depressing said boundary member to move in cooperation with said heat sensitive part an amount corresponding to volume changes of said liquid due to said temperature changes.

11. A pressure sensor, comprising:
    a case;
    a diaphragm provided within said case;

pressure detecting means provided within said case for detecting pressure applied to said diaphragm, said case, said pressure detecting means and said diaphragm being coupled together to define therebetween a pressure transmission chamber for sealingly accommodating therein liquid through which said pressure is transmitted from said diaphragm to said pressure detecting means; and means for absorbing volume changes of said liquid, which are caused due to temperature changes of said liquid, wherein said absorbing means includes means for varying a capacity of said pressure transmission chamber in response to said temperature changes of said liquid, and wherein said varying means includes a heat sensitive part for defining a pressure adjusting chamber therein within said pressure transmission chamber, one side of said heat sensitive part being kept in contact with said liquid within said pressure transmission chamber.

12. The pressure sensor according to claim 11, wherein said heat sensitive part is made of shape memory alloys to be deformed in response to said temperature changes of said liquid, thereby varying said capacity of said pressure transmission chamber.

13. The pressure sensor according to claim 11, wherein said heat sensitive part includes a cylindrical part deformed in response to said temperature changes of said liquid and flanges extending from opposite ends of said cylindrical part, peripheral ends of said flanges being kept in contact with an inner cylindrical surface of said case within said pressure transmission chamber, thereby defining said pressure adjusting chamber within said pressure transmission chamber.

14. A pressure sensor, comprising:

a case;

a diaphragm provided within said case;

pressure detecting means provided within said case for detecting pressure applied to said diaphragm, said case, said pressure detecting means and said diaphragm being coupled together to define therebetween a pressure transmission chamber for sealingly accommodating therein liquid through which said pressure is transmitted from said diaphragm to said pressure detecting means; and means for absorbing volume changes of said liquid, which are caused due to temperature changes of said liquid, wherein said absorbing means includes a slider slidingly movable within said pressure transmission chamber, said slider having a lower thermal expansion coefficient than that of said liquid.

15. The pressure sensor according to claim 14, wherein said slider has first and second ends, and wherein a first end of said slider is kept in contact with said diaphragm and a second end of said slider is kept in contact with said liquid sealingly accommodated between said slider and said pressure detecting means.

16. The pressure sensor according to claim 14, wherein said slider has first and second ends, and wherein a first end of said slider is kept in contact with said pressure detecting means and a second end of said slider is kept in contact with said liquid sealingly accommodated between said slider and said diaphragm.

* * * * *